Dec. 10, 1940. C. C. ABBOTT 2,224,583
SOLDERING IRON
Filed July 30, 1936 2 Sheets-Sheet 1
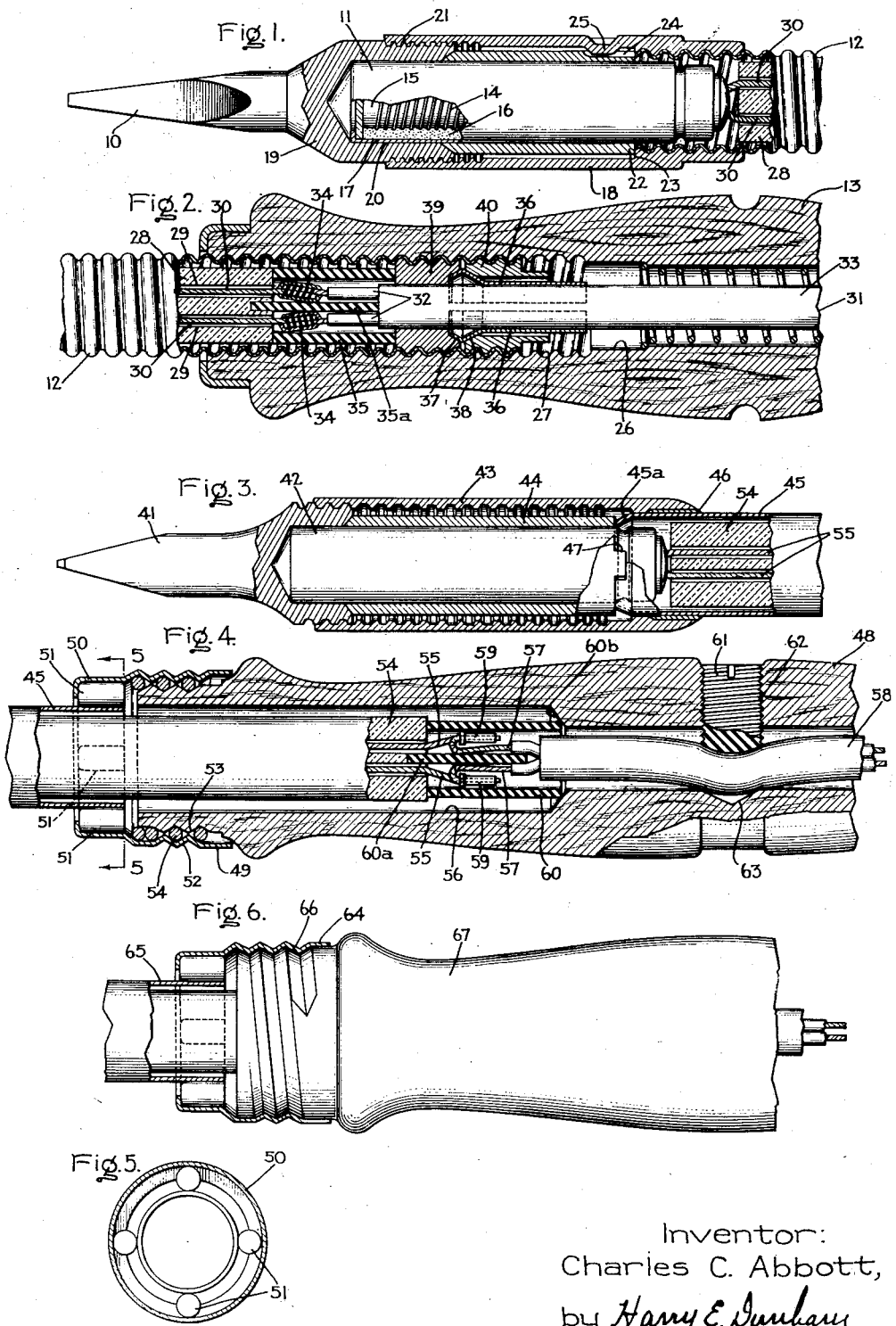
Inventor:
Charles C. Abbott,
by Harry E. Dunham
His Attorney.

Dec. 10, 1940.   C. C. ABBOTT   2,224,583
SOLDERING IRON
Filed July 30, 1936   2 Sheets-Sheet 2

Inventor:
Charles C. Abbott,
by Harry E. Dunham
His Attorney.

Patented Dec. 10, 1940

2,224,583

UNITED STATES PATENT OFFICE 2,224,583

SOLDERING IRON

Charles C. Abbott, Pittsfield, Mass., assignor to General Electric Company, a corporation of New York Application July 30, 1936, Serial No. 93,411

13 Claims. (Cl. 219—26)

This invention relates to soldering irons, more particularly to electric soldering irons, and it has for its object the provision of an improved device of this character.

This invention contemplates the provision of an improved organization of parts involving the soldering tip and heating element for the tip; and further contemplates improvements in the electrical connections for the heating element of the iron.

Figure 7:
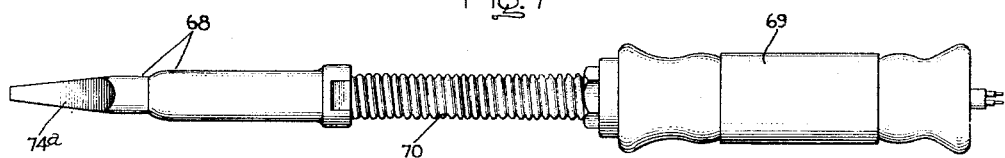
Figure 8:
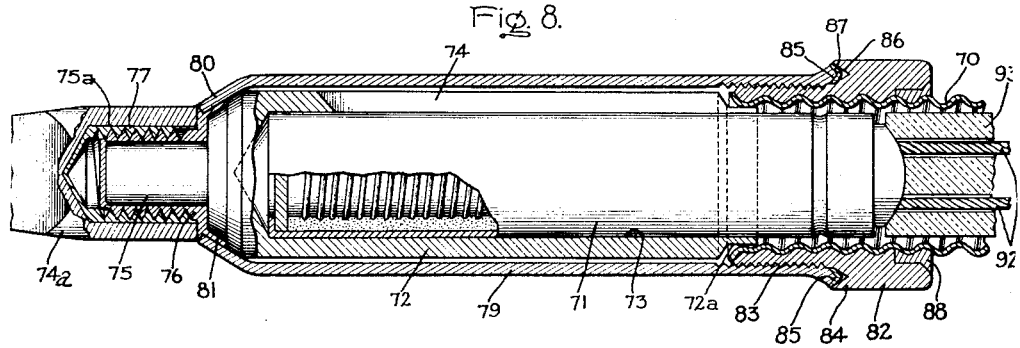
Figure 9:
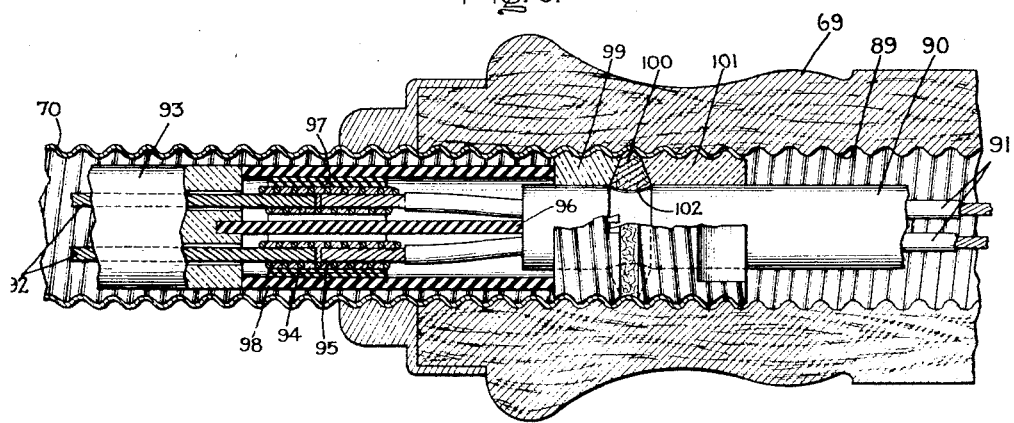
Figure 10:
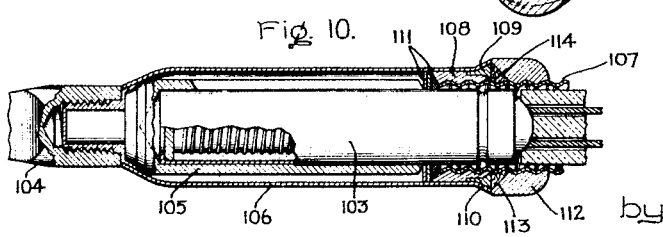

For a more complete understanding of this invention, reference should be had to the accompanying drawings in which Fig. 1 is a fragmentary elevation illustrating an organization of heating unit and soldering tip arranged in accordance with this invention, the organization being shown mainly in section, but having parts broken away so as to illustrate certain structural details; Fig. 2 is a fragmentary elevation mainly in section illustrating a handle structure used in the soldering iron of Fig. 1, and showing improved electrical connections for the heating element arranged in accordance with this invention; Fig. 3 is a view similar to Fig. 1, but illustrating a modified form of this invention; Fig. 4 is a view similar to Fig. 2, but illustrating the handle structure and electrical connections for the iron of Fig. 3; Fig. 5 is a sectional view taken through the line 5—5 of Fig. 4 and looking in the direction of the arrows; Fig. 6 is a fragmentary elevation of a handle structure of the type shown in Fig. 4, but of modified form, parts being shown in section so as to illustrate certain details of construction; Fig. 7 is an elevation of a soldering iron of modified form arranged in accordance with this invention; Fig. 8 is an enlarged sectional view of the heating unit and tip organization of the iron of Fig. 7, parts being broken away so as to illustrate certain details of construction; Fig. 9 is an enlarged sectional view of a portion of the handle structure of the iron of Fig. 7, parts being broken away so as to illustrate certain details of construction; and Fig. 10 is a sectional view of a heating element and soldering tip organization of modified form arranged in accordance with this invention.

Referring more particularly to Figs. 1 and 2, the invention has been shown in these figures as applied to a soldering iron having a working tip 10, a heating element 11 for applying heat to the tip 10, a metallic support 12 for the heating element and tip, and a handle 13 secured to the metallic support, whereby the iron may be manipulated.

As shown, the heating element 11 is of cylindrical form. This heating element may be of any suitable construction, but preferably will be of the sheathed type, such as described and claimed in my United States Patent No. 1,698,289, dated January 8, 1929. As there described, the heating element comprises a resistance conductor 14 wound upon an insulating core 15, and having a layer 16 of heat conducting, electrically insulating material between the resistance conductor and core and an outer metallic casing 17. The insulating layer may be formed of any suitable material, such as magnesium oxide.

The cylindrical heating unit 11 is mounted in a cylindrical casing 18 arranged in spaced relation with the unit, as shown. The casing 18 at its handle end is rigidly secured to the metallic support 12. For this purpose, the support 12 is threaded from end to end, the casing having a corresponding threaded section at its handle end receiving the threads on the casing, as shown in Fig. 1. Preferably, the threads on the support 12 will be formed by rolling or spinning them from the stock of the walls of the tube itself, as clearly shown in Fig. 1. This provides a relatively large thread as shown, and increases the length of the heat path from the heating element to the handle. After the casing is threaded on the support 12, the walls of the threaded section of the casing and of the support 12 within it are deformed, as by means of a square split die (not shown), so as to securely lock the casing to the support.

The soldering tip 10 is secured in the end of the casing opposite the handle end. For this purpose, the tip 10 is provided with an enlarged portion 19 having a centrally arranged bore 20 therein which receives the tip end of the heating element 11. A thread 21 is provided on the outer walls of the portion 19 which is received by a corresponding internal thread in the casing, as shown.

Secured to the outer surface of the heating unit 11 is a metallic sleeve 22, preferably formed of calorized copper. The sleeve 22 may be secured to the unit in any suitable manner, as by swaging the sleeve on the unit. The sleeve, as shown, is positioned intermediate the ends of the heating unit 11, the handle and of the sleeve bearing against a shoulder 23 provided for it on the casing 18, while the tip end serves as an abutment against which the portion 19 of the tip is forced when the tip is screwed in. It will be observed in view of this arrangement that when the portion 19 is screwed inwardly so as to abut against the tip end of the sleeve it will draw the casing toward the left so that the abutment 23 is forced tightly against the handle end of the sleeve 22. Preferably, the tip end of the sleeve will be tapered downwardly toward the heating element, as indicated, and the portion 19 will be provided with a corresponding taper so that when the portion 19 is threaded inwardly it will function to center the casing with reference to the sleeve 22 and the heating element 11.

Relative rotary motion between the heating element 11 and casing 18 is prevented by an interlock between these members formed by a slot or groove 24 formed in the outer wall of the sleeve 22 and a tongue 25 formed on the casing entering the slot. The tongue 25 preferably will be formed by pressing inwardly the stock of the casing, as shown. As shown, the slot 24 extends outwardly to the end of the sleeve so that the heating element can be moved outwardly through the tip end of the casing when it is desired to repair or replace the unit.

As pointed out previously, the metallic suport 12 is threaded from end to end. This member at its end opposite the tip receives the handle 13 in threaded engagement with it. The handle 13 is provided with a centrally arranged bore 26 having its tip end threaded, as indicated by the numeral 27, to receive the handle end of the metallic support 12.

Extending longitudinally through the metallic member 12, substantially from end to end thereof, is an insulating member 28 provided with a pair of spaced-apart passageways 29 through which a pair of leads 30 connected to the terminals of the heating element are directed. The member 28 is formed of any suitable material, such as porcelain. The leads 30, as shown, project from the end of the insulator 28 into the tube 12.

Entering the bore 26 of the handle is a suitable electrical supply lead 31 comprising a pair of supply conductors 32 which are insulated and which are covered by a common insulating coating 33 formed of any suitable electrically insulating yielding material, such as rubber. The ends of the conductors 32 are bared, as shown, and are arranged in overlapping relation with the associated ends of the leads. The overlapped ends of the leads and conductors are secured together by means of conducting wires 34 tightly wound about the ends, as shown in Fig. 2, and soldered after being wound.

An insulating sleeve 35 is inserted in the tubular member 12 about the portions of leads and conductors connected together, and these portions are separated by an insulating wall 35a. These members 35 and 35a preferably will be formed of a suitable insulating fiber.

The lead 31 is secured in the handle 13 against withdrawal by means of a pair of curved clamping members 36 positioned within the support 12 on opposite sides of the insulating coating 33, as shown. These members 36 are provided with oppositely inclined surfaces 37 and 38, preferably arranged at the tip end of the clamps. These inclined surfaces are arranged between a pair of clamping nuts 39 and 40 positioned on opposite sides of the surfaces and having threading engagement with the tubular support 12. The nuts as shown have wedging or inclined faces engaging the inclined faces 37 and 38 of the clamps, and the nuts are turned inwardly toward each other sufficiently to force the clamping members 36 tightly against the insulated covering 33.

Preferably, the inner nut 39 will be fitted tightly against the insulating sleeve 35 to hold it in place, and will be rigidly secured to the support in any suitable manner, as by brazing. It may be secured by indenting the support into the nut.

It will be understood that the threaded connection between the handle 13 and the support 12 provides means whereby the position of the handle can be adjusted relative to the heating unit and tip organization.

In the form of the invention shown in Figs. 3 and 4, the tip 41, heating element 42 therefor, casing 43 and sleeve 44 secured to the heating element are all arranged substantially as described in connection with Figs. 1 and 2, except that the thread in the casing 43 receiving the tip 41 is extended substantially through the length of the casing, as shown, as the thread in the casing 18 of Fig. 1 may also be arranged. The long thread increases the average clearance space between the sleeve 44 and the casing. In the iron of Figs. 3 and 4, the supporting member 45 is of straight tubular form and is not threaded as is the corresponding support of the first form. The tube 45, as shown, extends into the handle end of the casing 43 and is rigidly secured to the casing by a brazed or soldered joint 46. The inner end of the support 45 is turned inwardly, as indicated by the numeral 45a, substantially to the diameter of the heating element 42 in order to hold the handle end of the unit central with reference to the casing 43. In this case, the sleeve 44 is provided with a pair of lugs 47 diametrically opposite each other (only one shown) and projecting outwardly from the end of the sleeve, as shown. These lugs are received in similarly spaced recesses provided for them in the inclined part 46 of the sleeve. This arrangement prevents relative rotary motion between the heating element and casing 43 and support 45.

The support 45 is connected to the handle 48 by a connection means preventing direct conduction of heat from the support 45 to the handle. As shown, a handle ferrule 49 is provided between the tube 45 and the handle 48. This ferrule, as shown, has a portion 50 surrounding the tube 45 in spaced relation with it and within this space there are provided a plurality of pins 51 spaced circumferentially of the tube 45, as shown in Fig. 5. These pins have diameters such that they space the ferrule in substantially concentric relation with the tube 45, and so as to have line contact with the tube and ferrule. The pins 51 are rigidly secured to the tube and ferrule in any suitable manner, as by copper brazing.

The ferrule 49 is provided with a threaded section 52 which is positioned opposite a threaded section 53 provided on the handle. Lying within the threads on the handle and ferrule is a coiled member 54 formed of circular stock. This member, it will be observed, contacts the ferrule and handle with line contacts only.

It will be observed in view of the foregoing arrangement that the ferrule 49 is spaced a material distance from the metallic support 45 by the pins 51 and has very small direct thermal contact with the support. Also it will be observed that the ferrule is supported in spaced relation and has but line contact with the handle. The handle is, therefore, thermally insulated from the tube 45, and consequently, from the heating element and tip organization.

In this case, the insulating core 54 for the leads 55 of the heating element extends into a bore 56 provided for it in the handle. The leads 55 are secured to the conductors 57 of the twin supply conductor or lead 58 by means of suitable eyelets 59. The end portions of the bare conductors and the leads will preferably be arranged side by side, as shown in Fig. 4, and then twisted together, and then the eyelets will be slipped over the twisted portions and compressed or swaged into tight engagement with the conductors. Then the eyelets will be folded over, as indicated in Fig. 4. Surrounding the connected portions of the leads and conductors is an insulating sleeve 60, and interposed between them is an insulating wall or barrier 60a. The outer end of the sleeve 60 rests against a shoulder 60b provided in the handle, as shown.

In this case, the twin supply conductor 58 is secured by means of a plug or set screw 61 threaded in a bore 62 provided for it in the handle and arranged transversely of the bore 56. Opposite the bore 62 is an angular depression 63 into which the conductor is forced by the plug 61 when screwed inwardly sufficiently. This locks the lead against withdrawal from the handle, and also prevents twisting of the cord relative to the handle.

In the modified form of the invention shown in Fig. 6, the ferrule 64 is secured in the same manner to the tubular support 65 as is the ferrule 49 secured to the tube 45 of Fig. 4. In this case, however, the ferrule has a direct threaded connection 66 with the handle 67. In other words, the member 54 has been eliminated in this form. This form is particularly applicable to low voltage irons, such as those having a heating unit of 75 watts.

In Figs. 7, 8 and 9 there is illustrated still another form of this invention. In this case, the heating element and tip organization 68 is secured to the handle 69 by means of a threaded metallic tubular member 70, as are the heating element and tip organization and handle of the first form described in Figs. 1 and 2.

Referring to Fig. 8, the heating element 71 is inserted in a tubular member 72 that is provided with a bore 73 extending through one end and substantially through the full length of the sleeve to receive the heating element. The sleeve 72 is provided with a saw cut or similar slit 74 to prevent the sleeve from sticking to the unit.

At its left-hand end, as viewed in Fig. 8, the sleeve 72 supports a soldering tip 74a. For this purpose, the sleeve is provided with a solid cylindrical extension 75 which receives the tip in threaded engagement, as shown, the tip having a bore 75a receiving the extension. Preferably, the threads on the portion 75 will be formed in a coating 76 formed of a non-corrosive metal, such as silver, and the mating threads in the tip will be provided in a lining 77 in the tip bore 75a formed of a similar material. This connection eliminates corrosion in the threads and enhances the transfer of heat to the tip. The coating and lining are soldered to the extension 75 and tip respectively. If desired, instead of using the coating 76 and lining 77, the interior of the tip and the exterior of the extension 75 may be calorized.

Surrounding the sleeve 72 and in spaced relation with it is a casing 79. The casing 79 is provided at its tip end with a tapered section 80 which bears against a corresponding tapered section 81 provided on the sleeve 72. These tapered sections are brazed together. The casing, at its right-hand end is secured to the support 70 by means of a plug 82 which, as shown, is threaded on the support 70 and has an extension in the casing that has a threaded connection 83 with the casing, as shown. The plug 82 is further provided with an annular rim or head 84 overlying the adjacent edge of the casing. The casing, as shown, is provided with an angular seat 85 having two sides arranged substantially at 90° to each other. This seat is positioned opposite an angular shaped channel 86 arranged in the extension 84 on the head. Between the seat 85 and channel 86 is a suitable washer 87 formed of any suitable material, such as aluminum. It will be understood that originally, the washer is flat and that when the head is turned inwardly of the casing, it will force the washer into the shape shown against the two sides of the seat 85. Preferably, the channel 86 will have an angle less than the angle of the seat, such as 60°, so that when the plug 82 is threaded inwardly, the washer will be forced tightly against the seat 85, as shown, and will be wedged tightly against the two faces of the channel 86. This effects an airtight joint between the plug and casing. An airtight brazed joint 88 is provided between the plug and the support 70.

The sleeve 72, as shown, has a reduced extension 72a that fits into the end of the support 70.

The support 70, as shown, is inserted in a bore 89 provided for it in the handle 69, the bore being threaded to receive the threaded support, whereby the position of the handle with reference to the tip may be adjusted. Here also, an insulated twin-supply conductor 90 is directed into the bore 89 and its conductors 91 are connected to the leads 92 provided for the heating element 71. The leads, as shown, are threaded through an insulating core 93 in the tubular support 70, and are electrically connected to the conductors 91 by means of coiled connector members 94 wrapped tightly around the abutting ends of the leads and conductors. Preferably, the coiled connectors will be soldered to the conductors and leads, the soldering material 95 filling the spaces between the ends of the conductors and leads, and those between the turns of the connectors, as clearly shown in Fig. 9. The leads and connectors where joined are separated by an insulating barrier 96 and the joints are surrounded by suitable tapes 97, formed of insulating material. The whole is surrounded by an insulating tube 98 positioned in the tube 70 between the core 93 and a metallic nut 99 threaded on the support, as shown. The nut 99 is secured to the tube 70 by brazing or by indenting the tube into the nut.

Against the outer side of the nut 99 is an annular flexible washer 100 formed of any suitable yielding material, such as rubber. On the outer side of the annular member is a plug 101 also having a threaded connection with the tube 70. The plug 101 is turned inwardly sufficiently to tightly compress the annular member 100 so that it is forced into the insulated covering for the twin-supply conductor, as indicated by the numeral 102. The adjacent ends of the plugs 99 and 101 will be tapered, as shown in Fig. 9, so that when the plug 101 is turned inwardly, the tapered edges will engage the yieldable member 100 to force the material of the member inwardly into the insulated covering 90. At the same time, the member 101 is forced tightly against the support 70. This arrangement rigidly secures the conductor 90 in the handle.

In the form of the invention shown in Fig.

10, the heating unit 103, the tip 104, the sleeve 105 surrounding the unit and supporting the tip, and the casing 106 are all substantially arranged as described in connection with Figs. 7, 8, and 9. The casing 106, however, is secured to the support 107 in somewhat different fashion. In this case, a suitable bushing 108 is threaded on the support 107 and is positioned within the handle end of the casing 106, as shown. The bushing 108 is rigidly secured to the casing by means of a brazed joint 109 which effects an air-tight connection between the bushing and casing. Preferably, the casing will be flared outwardly somewhat and the bushing will be cut away to provide a channel 110 in which the brazing material is placed. Between the inner end of the plug and the adjacent end of the sleeve 106 are suitable metallic spacing washers 111. These washers center the heating unit, and reduce the flow of heat to the support 107.

Threaded on the sleeve 107 on the exterior of the casing is a nut 112 turned in tightly against the casing. Preferably and as shown, the nut 112 will be of the cup type having an annular recess 113 around the sleeve 107. Within this recess is placed a quantity of asbestos wicking 114 compressed tightly inwardly against the outer surface of the bushing and the brazed connection 109, and inwardly against the walls of the tube 107, as shown. This effects an air-tight joint between the casing and tubular support.

Handle structures disclosed in Figs. 2, 4 and 9 are described and claimed in my copending application Serial No. 286,541, filed July 26, 1939, which application is a division of this application.

Thermal insulating means between the handle structure and heating element and tip, disclosed in Figs. 4, 5 and 6, are described and claimed in my copending application Serial No. 197,353, filed March 22, 1938, which application is a division of this application.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A soldering iron and the like comprising a cylindrical heating unit, a tubular casing around said unit, a handle structure attached to said casing at one end, a working tip in thermal relation with said heating unit secured to the other end of said casing and a tongue and groove connection between said casing and heating unit to prevent relative rotary movement between them.

2. A soldering iron and the like comprising a cylindrical heating unit, a sleeve rigidly secured to said unit having a longitudinal recess in one end, a casing surrounding said sleeve having a tongue pressed inwardly from the stock of said sleeve into said recess to prevent relative rotary movement between said sleeve and casing but providing for longitudinal movement between them to permit said heating unit and sleeve to be withdrawn from the casing, a handle structure secured to the end of said casing adjacent said tongue and recess bearing against said sleeve, and a soldering tip threaded into said casing at the other end bearing against the sleeve at this end and having a recess receiving the corresponding end of said heating unit.

3. A soldering iron and the like comprising a tubular member, a casing arranged axially of said tubular member rigidly secured to one end thereof, this end of the tubular member extending into the casing, a heating unit in said casing having one end abutting the said end of said tubular member, a soldering tip fitted into the outer end of said casing bearing against said heating unit and screwed in tightly to force said heating unit against said tubular member, and an interlock between said tubular member and heating unit preventing relative rotary movement between them.

4. A soldering iron and the like comprising a heating unit, a casing therefor, a support, a plug secured to said support forced into said casing and having a head overlapping the end of said casing, a washer between said head and casing, and said head and casing having a complementary angular seat and channel between which the washer is tightly pressed, the seat having a greater angle than the channel.

5. A soldering iron and the like comprising a heating unit, a casing therefor, a working tip at one end of said unit, a metallic member, a screw plug on said metallic member having an air-tight joint with it and threaded into the other end of said casing opposite said tip, an annular extension on said plug overlying the adjacent end of said casing, said end having an angular seat extending toward said extension and said extension having an angular channel opposite said seat of less angularity than said seat and a metallic washer between said seat and channel pressed tightly against the sides of said seat and channel by said plug when threaded into said casing so as to provide an air-tight joint between said casing and plug.

6. A soldering iron and the like comprising a metallic member having an elongated aperture extending into it through one end thereof, a heating unit inserted in said aperture, a working tip on the other end of said member, a casing around said metallic member, a supporting member having one end threaded, a plug threaded on said end, an air-tight joint between said plug and supporting member, said plug being threaded into the end of said casing opposite said tip, and an air-tight joint between said plug and said casing.

7. A soldering iron and the like comprising a metallic heat conducting member having a bore therein extending through one end thereof and substantially to the opposite end, a working tip secured to said latter end, a heating element inserted in said bore, said member having a portion adjacent said tip tapering downwardly toward the tip, a casing around said heat conducting member having a tapered portion fitted to the tapered part of said member, a plug threaded in the end of said casing opposite said tip, and a support threaded in said plug.

8. A soldering iron and the like comprising a tip, a heating element for said tip, a casing for said heating element, a metallic support entering said casing, means securing said casing to said support, and a part of said support in said casing having an interlocking connection with said heating element to prevent rotary motion of said heating element in said casing.

9. A soldering iron and the like comprising a tip, a heating element for said tip, a casing for said heating element, a metallic tubular support having one end entering said casing and tapered inwardly to engage said heating element to center it with reference to said casing, notches in the inclined part of said support and projections on said heating element entering said notches so as to lock said heating element against rotary movement in said casing, and means securing said casing to said support.

10. A soldering iron comprising a heating unit, a casing for said heating unit spaced therefrom, a soldering tip having a section inserted in the space between said casing and heating unit and having a bore receiving the adjacent end of said heating unit, and a stop in the opposite end of said casing preventing movement of said heating unit from said bore.

11. A soldering iron comprising a heating unit, a casing for said heating unit spaced therefrom, a soldering tip having a section inserted in the space between said casing and heating unit and having a bore receiving the adjacent end of said heating unit, a stop in the opposite end of said casing preventing movement of said heating unit from said bore, and locking means associated with said heating unit to prevent rotary movement thereof relative to said casing.

12. A soldering iron comprising a heating unit, a cylindrical heat conducting member having a bore receiving said heating unit, a soldering tip in direct thermal relation with said heat conducting member, a casing having one end mounted directly on said heat conducting member, and a metallic support mounting the other end of said casing and having a section extending into said casing and associated with said heating unit to prevent displacement thereof in said casing.

13. A soldering iron comprising a cylindrical heating element, a casing around said cylindrical heating element in spaced relation with it, a heat conducting sleeve tightly fitted on said heating element, a soldering tip having a threaded section inserted in the space between one end of said heating unit and casing and threaded in said casing and up tightly against said heat conducting sleeve, said section having a bore receiving the adjacent end of said heating unit, and an abutment in the other end of said casing to limit the inward movement of said sleeve.

CHARLES C. ABBOTT.